2,720,281

PURIFICATION OF TITANIUM TRICHLORIDE

Robert A. Ruehrwein and Gordon B. Skinner, Dayton, Ohio, assignors to Monsanto Chemical Company, St. Louis, Mo., a corporation of Delaware No Drawing. Application October 31, 1952,
Serial No. 318,101

4 Claims. (Cl. 183—119)

This invention relates to the purification of titanium trichloride, and more specifically to the separation of titanium trichloride from carbon monoxide when the two are together as gases at elevated temperatures. The invention particularly pertains to methods for obtaining from such gaseous mixtures solid titanium trichloride free from impurities which would normally result from the presence of the carbon monoxide.

The production of titanium trichloride is often accompanied by the simultaneous production of carbon monoxide. For example, in the copending patent application of Stauffer, Serial No. 317,863, filed on even date herewith, there is disclosed a method of producing titanium trichloride by the reaction of titanium tetrachloride with titanium oxycarbide (TiO.TiC). In this reaction appreciable quantities of carbon monoxide are produced along with the titanium trichloride. When the mixture of gaseous titanium trichloride and carbon monoxide reaction products are cooled to condense and recover the titanium trichloride, the reaction tends to reverse so that appreciable quantities of titanium oxide and titanium carbide are formed and condensed as solid impurities in the recovered solid titanium trichloride. Thus, during the recovery of titanium trichloride from gaseous mixtures containing titanium trichloride and carbon monoxide there are at least three reactions involved. These reactions may be represented by the following equations in which the letters "g" and "s" in parentheses indicate whether the material is present in the gaseous or solid state:

(Eq. 1) $8TiCl_3(g) + CO(g) \rightarrow 6TiCl_4(g) + TiO(s) + TiC(s)$ (Eq. 2) $TiCl_3(g) \rightarrow TiCl_3(s)$ (Eq. 3) $8TiCl_3(s) + CO(g) \rightarrow 6TiCl_4(g) + TiO(s) + TiC(s)$ The tendencies of these reactions to go in the direction indicated by the foregoing equations, and the rates at which these reactions are carried out, are very sensitive functions of temperature, and there are considerable changes (of both magnitude and direction) of the reaction tendencies and rates during the cooling and condensation steps in the recovery of solid titanium trichloride.

We have found that the interrelationships of the tendencies to go in the directions indicated by the foregoing equations, and the rates of these reactions, are such that the gaseous titanium trichloride can be condensed as a solid substantially free from titanium oxide and titanium carbide impurities by rapidly cooling the gaseous mixtures of titanium trichloride and carbon monoxide from a temperature above about 800° C., and preferably above about 1000° C., to a temperature below the dewpoint temperature of titanium trichloride in the gaseous mixture. If the dewpoint temperature is very high (e. g., greater than about 650° C.), it will generally be desirable to cool down to at least about 650° C., and preferably to about 500° C., in order to effect a reasonable recovery of TiCl₃ from the gases.

The cooling of the gaseous mixture through the foregoing ranges of temperatures should be as rapid as possible, since the amounts of impurities in the solid titanium trichloride product will increase quite rapidly with decreased cooling rates. The cooling should be preferably substantially instantaneous, such as can be attained by the adiabatic cooling resulting from flashing the gases into a zone of reduced pressure. A similar instantaneous cooling effect may be obtained by rapidly mixing the hot gases with a body of cooler gases at a temperature such that the mixture of gases will end up at the desired lower temperature.

It will be readily apparent that other means are available and adequate for the rapid cooling of the gaseous mixtures containing titanium trichloride and carbon monoxide. Any means which cools the gases sufficiently rapidly so that the gases are in the temperature range between about 1000° C. and about 500° C. for not more than about 4 or 5 seconds, and preferably not more than one or two seconds, is adequate for purposes of the present invention.

The invention is particularly applicable to multi-component gas mixtures which may contain the titanium trichloride and carbon monoxide in only minor amounts while containing appreciable or even predominant proportions of other gases such as titanium tetrachloride, argon, etc. In fact, if the temperature to which the gases are cooled is such that the precipitated solid titanium trichloride is at a temperature greater than about 400° C., then it is highly desirable that the gaseous mixture contain a major proportion of titanium tetrachloride in order to overcome the tendency of the solid titanium trichloride to decompose at the elevated temperature.

The following example is presented as illustrative of a specific preferred embodiment of the present invention, and should not be construed as limiting the described invention in any way.

Example

A stream of titanium tetrachloride at one atmosphere pressure and 1100° C. was passed over a solid solution of titanium monoxide and titanium carbide (1:1 mole ratio of oxide to carbide) to form a product gas stream containing titanium tetrachloride, titanium trichloride, and carbon monoxide. When these gases are slowly cooled to below about 500° C., large quantities of titanium carbide and titanium monoxide are found as impurities in the recovered solid titanium trichloride. However, when the gas stream was rapidly cooled to below about 500° C. (at a rate of about 500° C. per second), the recovered titanium trichloride had only a very slight amount of titanium carbide and titanium monoxide present as impurities.

What we claim is:

1. The method of obtaining, from a gaseous mixture containing titanium trichloride, carbon monoxide and sufficient titanium tetrachloride to prevent the decomposition of said titanium trichloride, solid titanium trichloride substantially free from contamination by reaction products of carbon monoxide, which comprises rapidly cooling said gaseous mixture from a temperature above about 800° C. to below the dewpoint temperature of the titanium trichloride in the gas stream, at a rate sufficiently rapid to substantially prevent reaction between gaseous titanium trichloride and carbon monoxide.

2. The method of obtaining, from a gaseous mixture containing titanium trichloride, carbon monoxide and sufficient titanium tetrachloride to prevent the decomposition of said titanium trichloride, solid titanium trichloride substantially free from contamination by reaction products of carbon monoxide, which comprises rapidly cooling said gaseous mixture from a temperature above about 1000° C. to below the lower of the temperatures selected from 650° C. and the dewpoint temperature of the titanium trichloride in the gas stream, said cooling being at a rate sufficiently rapid to substantially prevent reaction between gaseous titanium trichloride and carbon monoxide.

3. The method of obtaining, from a gaseous mixture containing titanium trichloride, carbon monoxide and sufficient titanium tetrachloride to prevent the decomposition of said titanium trichloride, solid titanium trichloride substantially free from contamination by reaction products of carbon monoxide, which comprises rapidly cooling said gaseous mixture from a temperature above about 1000° C. to below the lower of the temperatures selected from 500° C. and the dewpoint temperature of the titanium trichloride in the gas stream to condense solid titanium trichloride, and thereafter separating the remaining gases and the said titanium trichloride, the aforesaid rapid cooling being at a rate sufficient to substantially prevent reaction between gaseous titanium trichloride and carbon monoxide.

4. The method of obtaining, from a gaseous mixture containing titanium trichloride, carbon monoxide and sufficient titanium tetrachloride to prevent the decomposition of said titanium trichloride, solid titanium trichloride substantially free from contamination by reaction products of carbon monoxide, which comprises condensing the titanium trichloride by rapidly cooling said gaseous mixture from a temperature above about 1000° C. to a temperature below about 400° C. in less than about five seconds, and thereafter separating said solid titanium trichloride from the remaining uncondensed gases.

References Cited in the file of this patent

UNITED STATES PATENTS

| | | |
|---|---|---|
| 2,306,184 | Pechukas | Dec. 22, 1942 |
| 2,376,190 | Roetheli | May 15, 1945 |
| 2,443,210 | Upham | June 15, 1948 |
| 2,488,439 | Schauman | Nov. 15, 1949 |
| 2,657,979 | Saladin et al. | Nov. 3, 1953 |

OTHER REFERENCES

Mellor, Comprehensive Treatise on Inorganic and Theoretical Chemistry, vol. 7, pages 75, 76. Longmans, Green and Co., New York.